US 6,536,720 B1

(12) United States Patent
Yu

(10) Patent No.: US 6,536,720 B1
(45) Date of Patent: Mar. 25, 2003

(54) MUSIC STAND

(76) Inventor: Ming-Ti Yu, 122-5, Jun Liao Rd., Feng Yuan, Taichung Hsien (TW)

( * ) Notice: Subject to any disclaimer, the term of this patent is extended or adjusted under 35 U.S.C. 154(b) by 13 days.

(21) Appl. No.: 09/961,562

(22) Filed: Sep. 20, 2001

(51) Int. Cl.[7] .............................................. A47B 19/00
(52) U.S. Cl. ................. 248/125.7; 248/122.1; 248/178.1; 248/185.1; 248/441.1
(58) Field of Search ........................... 248/125.7, 125.8, 248/125.9, 122.1, 121, 177.1, 178.1, 183.2, 185.1, 176.3, 441.1, 458, 187.1

(56) References Cited

U.S. PATENT DOCUMENTS

| | | | | |
|---|---|---|---|---|
| 1,437,579 A | * | 12/1922 | Wilson | 108/8 |
| 2,552,054 A | * | 5/1951 | Misic | 366/201 |
| 5,154,382 A | * | 10/1992 | Hoshino | 248/185.1 |
| 5,636,824 A | * | 6/1997 | Biasini et al. | 248/441.1 |
| 5,833,199 A | * | 11/1998 | Benting et al. | 248/441.1 |
| 6,193,204 B1 | * | 2/2001 | Hsu | 248/441.1 |

FOREIGN PATENT DOCUMENTS

| DE | 4316433 A1 | * | 9/1994 | A47B/19/06 |
|---|---|---|---|---|

* cited by examiner

Primary Examiner—Korie Chan

(57) ABSTRACT

A music stand has a tripod stand, a shaft disposed on the tripod stand, a rod connected to the shaft, a tube disposed on the rod, a mount disposed on the tube, an adjustment frame, a first hollow gasket plate, a second hollow gasket plate, an adjustment button, a screw rod, a bolt, a hollow nut, and a music rest. The mount has an upper block, a through hole, and two opposite grooves to receive the first hollow gasket plate and the second hollow gasket plate. The adjustment button has a threaded hole. The music rest has a rear socket. The adjustment frame has an insertion end inserted in the rear socket, a threaded aperture, a first lug and a second lug. The mount is disposed between the first lug and the second lug. The bolt fastens the rear socket, the adjustment frame, and the hollow nut together. The screw rod fastens the adjustment frame, the mount, and the adjustment button together.

3 Claims, 7 Drawing Sheets

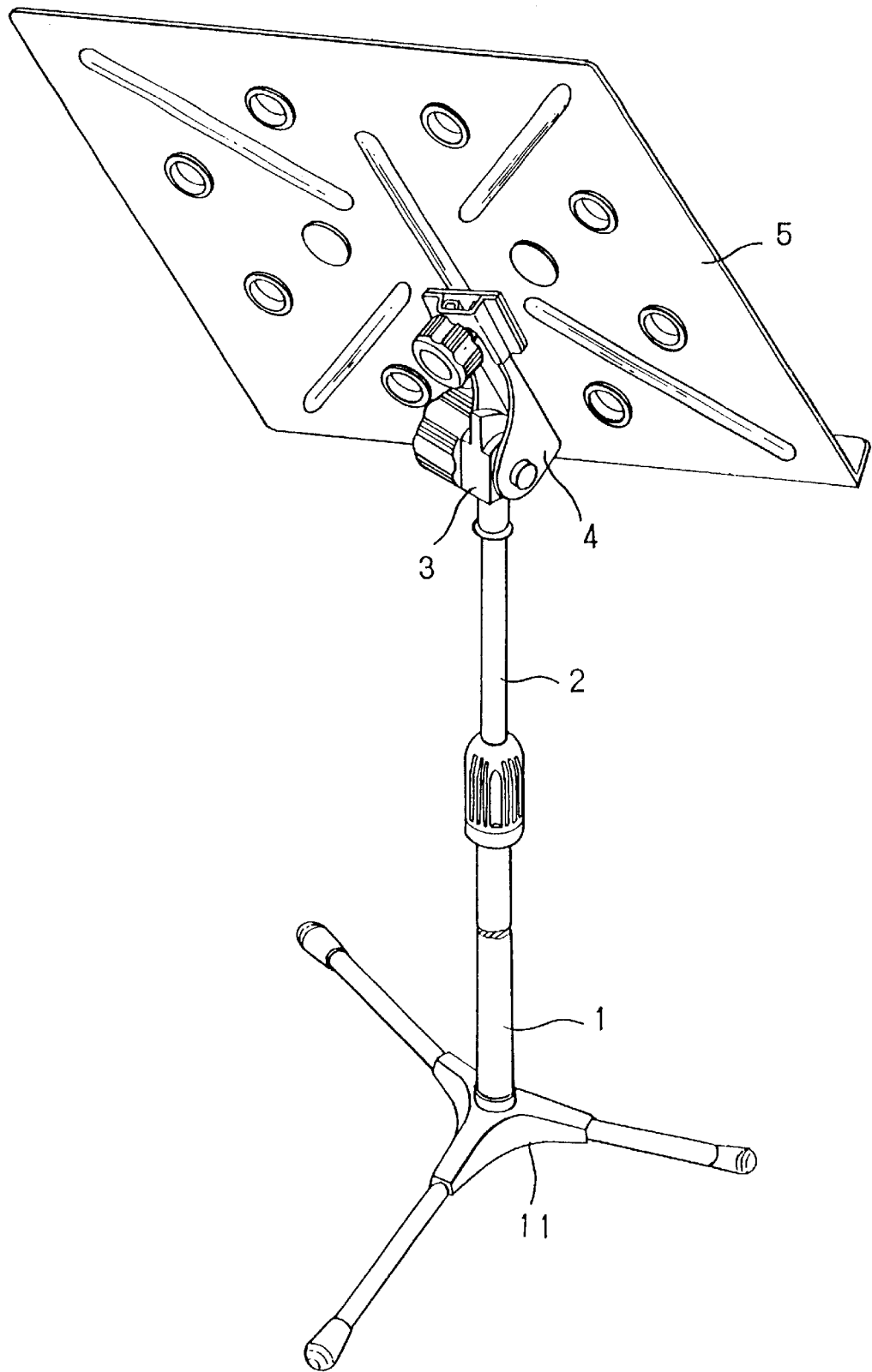
F I G. 1

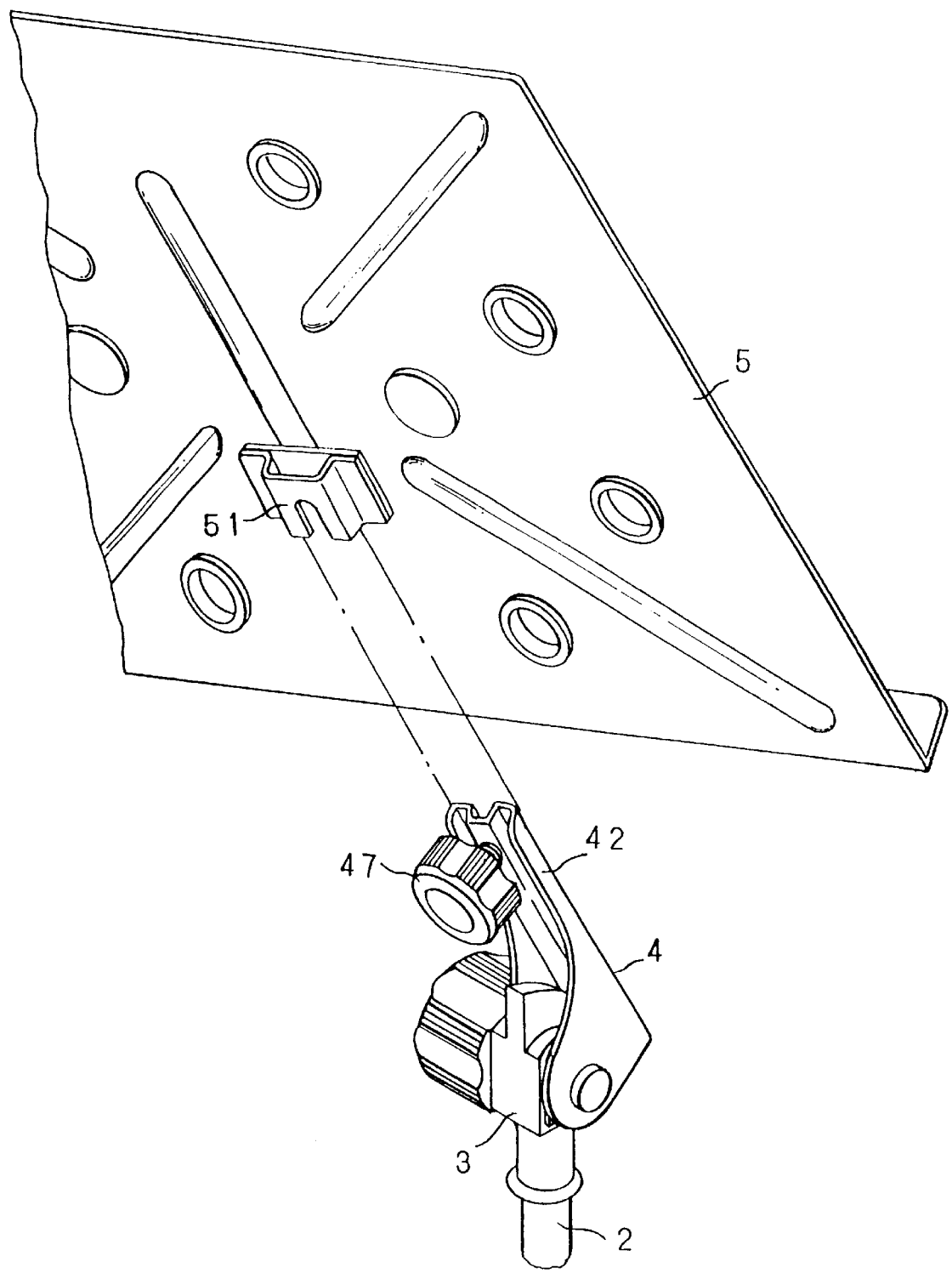
F I G. 3

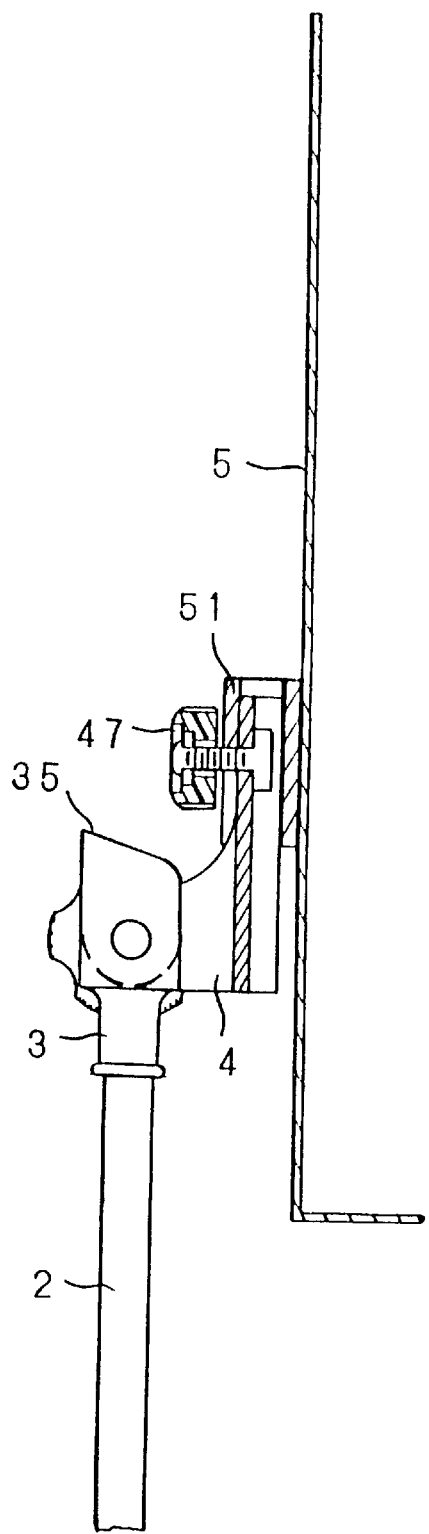
F I G. 4

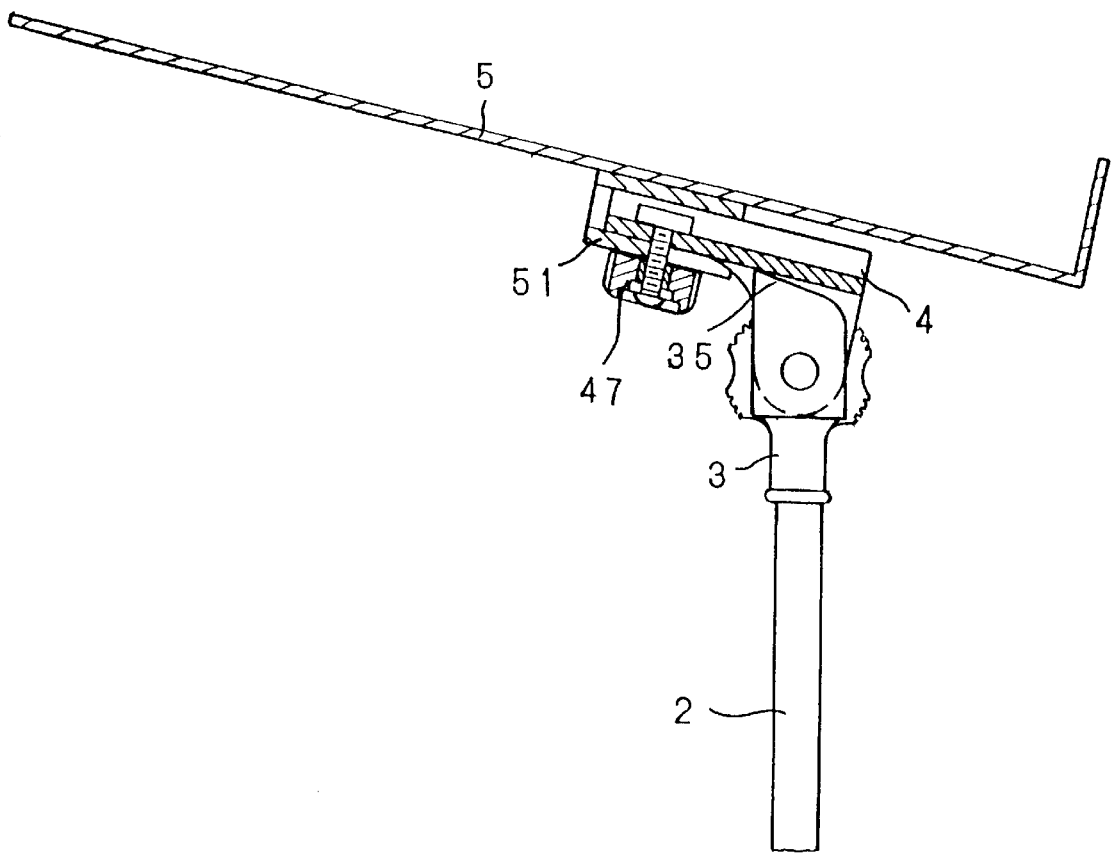
F I G. 5

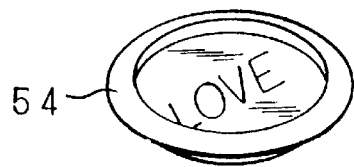
F I G. 7
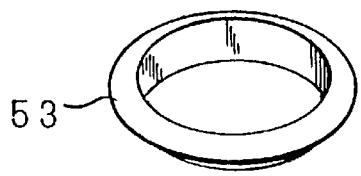
F I G. 8
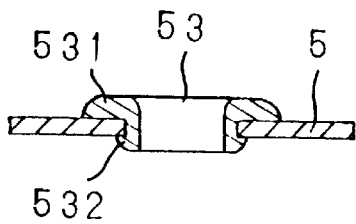
F I G. 9

MUSIC STAND

BACKGROUND OF THE INVENTION

The present invention relates to a music stand. More particularly, the present invention relates to a music stand which has an adjustment frame, a mount, an adjustment button, and a screw rod in order to adjust a music rest quickly.

A conventional music stand has a shaft, a tripod stand supporting the shaft, an adjustment lever inserted through the shaft, and a music rest disposed on the adjustment lever. The user should operate a screw to fasten the adjustment lever in the shaft. The user will loosen the screw in order to adjust the adjustment lever, and tighten the screw after the adjustment lever is adjusted.

SUMMARY OF THE INVENTION

An object of the present invention is to provide a music stand which has an adjustment frame, a mount, an adjustment button, and a screw rod in order to adjust a music rest quickly.

Accordingly, a music stand comprises a tripod stand, a shaft disposed on the tripod stand, a rod connected to the shaft, a tube disposed on the rod, a mount disposed on the tube, an adjustment frame, a first hollow gasket plate, a second hollow gasket plate, an adjustment button, a screw rod, a bolt, a hollow nut, and a music rest. The mount has an upper block, a through hole, and two opposite grooves to receive the first hollow gasket plate and the second hollow gasket plate. The adjustment button has a threaded hole. The music rest has a rear socket. The adjustment frame has an insertion end inserted in the rear socket, a threaded aperture, a first lug and a second lug. The mount is disposed between the first lug and the second lug. The bolt passes through the threaded aperture of the adjustment frame and the hollow nut to fasten the rear socket, the adjustment frame, and the hollow nut together. The screw rod passes through the first lug, the first hollow gasket plate, the through hole of the mount, the second lug, the second hollow gasket plate, and the adjustment button to fasten the adjustment frame, the mount, and the adjustment button together.

BRIEF DESCRIPTION OF THE DRAWINGS

FIG. 1 is a perspective assembly view of a music stand of a preferred embodiment in accordance with the present invention;

FIG. 3 is a perspective exploded view of an adjustment frame and a music rest of a preferred embodiment in accordance with the present invention;

FIG. 4 is a sectional assembly view of an adjustment frame and a music rest of a preferred embodiment in accordance with the present invention;

FIG. 5 is a schematic view illustrating an operation of a music rest of a preferred embodiment in accordance with the present invention;

FIG. 7 is a perspective view of a decoration button of a preferred embodiment in accordance with the present invention;

FIG. 8 is a perspective view of a ring of a preferred embodiment in accordance with the present invention; and FIG. 9 is a sectional assembly view of a ring and a music rest of a preferred embodiment in accordance with the present invention.

DETAILED DESCRIPTION OF THE INVENTION

Figure 2:
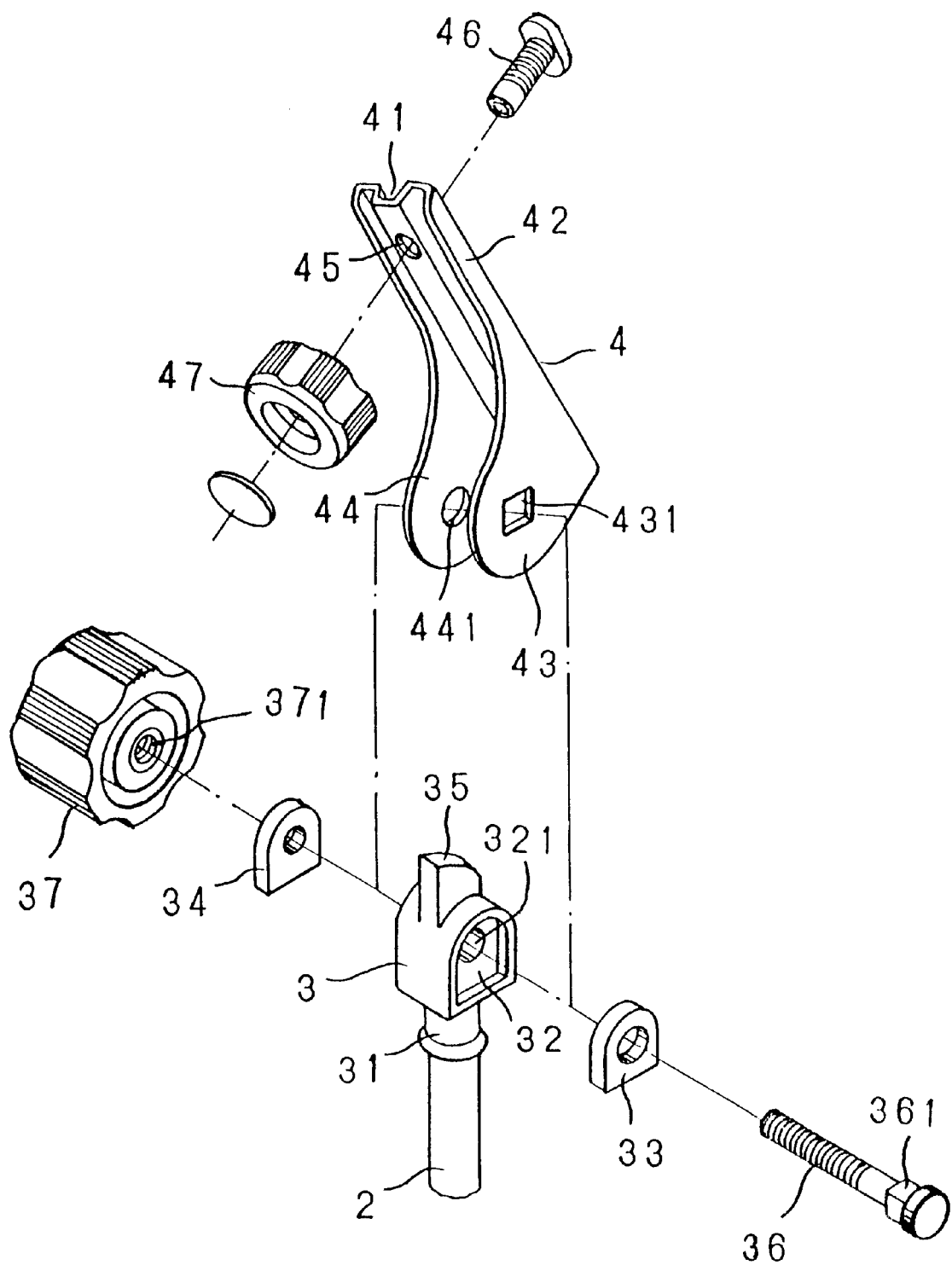
FIG. 2 is a perspective exploded view of an adjustment frame, a mount, an adjustment button, and a screw rod of a preferred embodiment in accordance with the present invention.
Figure 6:
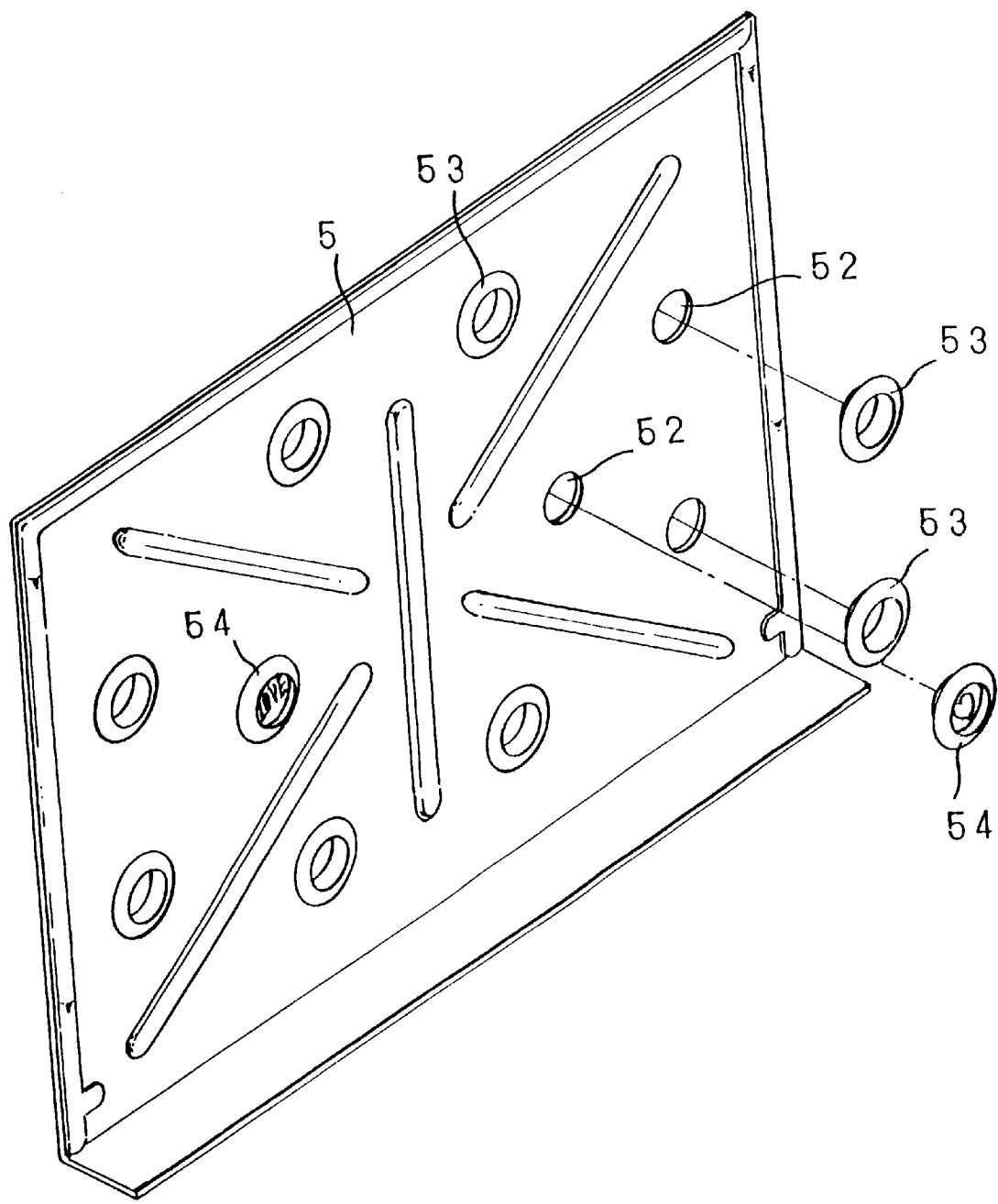
FIG. 6 is a perspective view of a music rest of a preferred embodiment in accordance with the present invention.

Referring to FIGS. 1 to 9, a music stand comprises a tripod stand 11, a shaft 1 disposed on the tripod stand 11, a rod 2 connected to the shaft 1, a tube 31 disposed on the rod 2, a mount 3 disposed on the tube 31, an adjustment frame 4, a first hollow gasket plate 33, a second hollow gasket plate 34, an adjustment button 37, a screw rod 36, a bolt 46, a hollow nut 47, and a music rest 5.

The mount 3 has an upper block 35, a through hole 321, and two opposite grooves 32 to receive the first hollow gasket plate 33 and the second hollow gasket plate 34.

The screw rod 36 has a square neck 361.

The adjustment button 37 has a threaded hole 371.

The music rest 5 has a rear socket 51 and a plurality of round apertures 52 to receive a plurality of rings 53 and a plurality of decoration buttons 54.

Each of the rings 53 has an annular body 531 and an annular flange 532.

The adjustment frame 4 has an insertion end 42 inserted in the rear socket 51, an elongated recess 41, a threaded aperture 45, a first lug 43 and a second lug 44.

The mount 3 is disposed between the first lug 43 and the second lug 44.

The bolt 46 passes through the threaded aperture 45 of the adjustment frame 4 and the hollow nut 47 to fasten the rear socket 51, the adjustment frame 4, and the hollow nut 47 together.

The screw rod 36 passes through the first lug 43, the first hollow gasket plate 33, the through hole 321 of the mount 3, the second lug 44, the second hollow gasket plate 34, and the adjustment button 37 to fasten the adjustment frame 4, the mount 3, and the adjustment button 37 together.

The first lug 43 has a square hole 431.

The second lug 44 has a circular hole 44.

The present invention is not limited to the above embodiments but various modification thereof may be made. Furthermore, various changes in form and detail may be made without departing from the scope of the present invention.

I claim:

1. A music stand comprises:
    a tripod stand, a shaft disposed on the tripod stand, a rod connected to the shaft, a tube disposed on the rod, a mount disposed on the tube, an adjustment frame, a first hollow gasket plate, a second hollow gasket plate, an adjustment button, a screw rod, a bolt, a hollow nut, and a music rest,
    the mount having an upper block, a through hole, and two opposite grooves to receive the first hollow gasket plate and the second hollow gasket plate,
    the adjustment button having a threaded hole,
    the music rest having a rear socket,
    the adjustment frame having an insertion end inserted in the rear socket, a threaded aperture, a first lug, and a second lug,
    the mount disposed between the first lug and the second lug, the bolt passing through the threaded aperture of the adjustment frame and the hollow nut to fasten the rear socket, the adjustment frame, and the hollow nut together, and the screw rod passing through the first lug, the first hollow gasket plate, the through hole of the mount, the second lug, the second hollow gasket plate, and the adjustment button to fasten the adjustment frame, the mount, and the adjustment button together.

2. The music stand as claimed in claim 1, wherein the first lug has a square hole and the second lug has a circular hole.

3. The music stand as claimed in claim 1, wherein the music rest has a rear socket and a plurality of round apertures.

* * * * *